United States Patent
Morovic et al.

(10) Patent No.: US 9,794,444 B2
(45) Date of Patent: Oct. 17, 2017

(54) EMBEDDING DATA IN A PRINTED OUTPUT

(71) Applicant: Hewlett-Packard Development Company, L.P., Houston, TX (US)

(72) Inventors: Jan Morovic, Colchester (GB); Peter Morovic, Sant Cugat del Valles (ES); Matthew D. Gaubatz, Seattle, WA (US); Adam Franks, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/326,432

(22) PCT Filed: Jul. 16, 2015

(86) PCT No.: PCT/US2015/040760
§ 371 (c)(1),
(2) Date: Jan. 13, 2017

(87) PCT Pub. No.: WO2016/018641
PCT Pub. Date: Feb. 4, 2016

(65) Prior Publication Data
US 2017/0214821 A1   Jul. 27, 2017

Related U.S. Application Data

(63) Continuation-in-part of application No. 14/446,801, filed on Jul. 30, 2014, now Pat. No. 9,313,360.

(51) Int. Cl.
H04N 1/00 (2006.01)
H04N 1/32 (2006.01)
(Continued)

(52) U.S. Cl.
CPC ....... H04N 1/32309 (2013.01); G06T 1/0028 (2013.01); H04N 1/56 (2013.01); H04N 1/644 (2013.01); H04N 2201/327 (2013.01)

(58) Field of Classification Search
None
See application file for complete search history.

(56) References Cited

U.S. PATENT DOCUMENTS 3,963,953 A   6/1976 Thornton
6,325,420 B1  12/2001 Zhang et al.
(Continued)

FOREIGN PATENT DOCUMENTS

WO   WO-2013113372   8/2013

OTHER PUBLICATIONS

Bergman, Lars "Using multicoloured halftone screens for offset print quality monitoring," Linköping Studies in Science and Technology Licentiate Thesis No. 1147 (Jan. 2005), 118 pages.
(Continued)

*Primary Examiner* — Paul F Payer
(74) *Attorney, Agent, or Firm* — HP Inc. Patent Department (57) ABSTRACT

A method of embedding data in a printed output having at least two-dimensions is described in which content data for the printed output and data to be embedded in the printed output are obtained. An input property value for a content element from the content data is determined. This is used to determine an output value for a probabilistic distribution of a set of output material compositions for a spatial element of the printed output, corresponding to the content element, based on the data to be embedded and the input property value.

15 Claims, 5 Drawing Sheets

(51) Int. Cl.
*G06T 1/00* (2006.01)
*H04N 1/56* (2006.01)
*H04N 1/64* (2006.01)

(56) References Cited

U.S. PATENT DOCUMENTS

| | | |
|---|---|---|
| 7,062,087 B1 | 6/2006 | Varga |
| 7,922,209 B1 | 4/2011 | Beretta |
| 8,045,755 B2 | 10/2011 | Vigouroux |
| 8,213,055 B2 | 7/2012 | Morovic et al. |
| 8,451,501 B2 | 5/2013 | Xu et al. |
| 8,699,081 B2 | 4/2014 | Rijavec |
| 8,705,140 B2 | 4/2014 | Li et al. |
| 2003/0072037 A1 | 4/2003 | Hamilton |
| 2006/0193522 A1 | 8/2006 | Sonoda et al. |
| 2008/0100856 A1 | 5/2008 | Lee et al. |
| 2010/0060943 A1 | 3/2010 | Monga et al. |
| 2011/0200262 A1 | 8/2011 | Canel-Katz et al. |
| 2013/0019767 A1 | 1/2013 | Sanger |
| 2013/0329006 A1 | 12/2013 | Boles et al. |
| 2014/0052285 A1 | 2/2014 | Butcher et al. |
| 2014/0326864 A1 | 11/2014 | Foyle |

OTHER PUBLICATIONS

PCT International Search Report and Written Opinion, Nov. 6, 2015, PCT Application No. PCT/US2015/040760, Korean Intellectual Property Office, 8 pages.

Ping Wah Wong and Nasir D. Memon, Image Processing for Halftones—Focusing on inverse halftoning, compression, and watermarking, IEEE Signal Processing Magazine, Jul. 2003, pp. 59-70.

EMBEDDING DATA IN A PRINTED OUTPUT

BACKGROUND

Data embedding is a technique for adding a representation of information into an article, such as a letter or a banknote. A special case of data embedding is steganography, which is the science and art of secret communication. In steganography, the presence of a hidden message typically needs to be concealed in a signal, despite the fact that the signal must be altered to enable the embedding. In physically printed, or rendered content, however, a different approach to data embedding is possible. For example, a data-bearing pattern may be achieved by manipulating a halftone rendering engine. In a data-bearing halftone, data is embedded in a halftone printed output by shifting certain output spatial element values, e.g. in two-dimensions shifting certain pixel values from 0 to 1. Another case of data hiding is watermarking, where it may be desired to determine the authenticity of a book or certificate. In this case, the presence of a watermark may indicate authenticity, while the absence of a watermark may indicate a forgery. When watermarking a printed output there may be a challenge of avoiding an active adversary that would attempt to remove, invalidate or forge watermarks in digital content. Another example of data embedding involves quick response (QR) codes, which provide machine-readable codes that are visible and may be used to convey information such as uniform resource locators.

BRIEF DESCRIPTION OF THE DRAWINGS

Various features of the present disclosure will be apparent from the detailed description which follows, taken in conjunction with the accompanying drawings, which together illustrate certain example features, and wherein.

DETAILED DESCRIPTION

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to embedding data in a multi-dimensional printed output. Certain examples may be applied to both two-dimensional and three dimensional printed outputs. These examples provide a way to encode or embed data such that it may not be detectable under a first set of inspection conditions yet detectable under a second set of inspection conditions. This may be useful for many applications including authentication of printed objects, identification of said objects (e.g. where the data is an identifier for the object), and message passing. These applications may be implemented in security solutions, e.g. allowing objects to be tracked in associated with a database of registered objects.

In certain examples described herein, data may be embedded using multiple property mappings within a multi-dimensional printing system. For example, a property mapping may be a dataset that relates property values in one 'space' to another 'space', e.g. by functionally mapping input values in an input space to output values in an output space via a function or operation. In these cases, property mapping is a process by which an input or desired value of a given property of a multi-dimensional printed output is mapped to an output value for the property that is used to produce the output, e.g. by a two or three-dimensional printer. In one case, the input property value may be defined in an input property space (e.g. an M dimensional co-ordinate system having defined ranges of values) and the output property value may be defined in a output property space (e.g. an N dimensional co-ordinate system having defined ranges of values), where the property mapping defines a linear or non-linear mapping between the two spaces (e.g. a geometric mapping between the two co-ordinate systems). In examples described herein, the input and output property spaces are selected such that N is greater than M (in certain cases much greater than M, i.e. N>>M). Due to this increase in dimensionality there is redundancy in the output property space, e.g. under a first set of inspection conditions a particular point in the input property space may be mapped to a multi-dimensional volume in the output property space. In this case, under the first set of inspection conditions, the multi-dimensional volume in the output property space may contain output property values that differ from each other or a reference output property value by less than a given metric value indicative of a perceivable or detectable (i.e. measurable) aspect of the property.

An example of a property that may be mapped in this way is color, wherein the property mapping may map a color from one representation to another. For example, input data may define a desired color of a spatial element of the content of a multi-dimensional printed output. This input data may be defined by a color value in a first color space, e.g. in one of: a Red, Green, Blue (RGB) color space; a Cyan, Magenta, Yellow and Black (CMYK) color space; or the International Commission on Illumination (CIE) 1931 XYZ color space. This first color space may be three-dimensional (a so-called tri-stimulus color space). Through print system configuration, a mapping from the input color value to a second higher-dimensionality space, e.g. a Neugebauer Primary area coverage (NPac) vector for a two-dimensional print or a material volume coverage (MVoc) vector for a three-dimensional print, may indicate that multiple NPac or MVoc vector values are useable to produce the input color value in the multi-dimensional printer output. In one case, this may be determined by computing a CIE delta E value with reference to the input color value and a measured color produced when using a certain NPac or MVoc vector value, e.g. selecting NPac or MVoc vector values that result in a delta E value below a defined threshold. In this way, it may be said that there exist multiple color paramers or metamers (wherein the difference between a paramer and a metamer may depend on at least one metric threshold, i.e. paramers allow a higher threshold or less strict matching). As NPac or MVoc vector values in this example represent an output material composition space, this process may be extended from color to other properties of a multi-dimensional printed output, e.g. electrical conductivity or resistance, magnetization, magnetic permeability, spectral reflectance, fluorescence, and various mechanical properties such as shear strength, plasticity, flexural strength etc. For example, if an electrical resistance of 50 ohms or a shear strength of 10 MPa is set as an input property value, there may multiple material compositions for a spatial element of an output (e.g. a print resolution voxel) that result in this property. This enables a mapping from the input property value to a probabilistic distribution of a set of output material compositions for the spatial element of the printed output (e.g. an MVoc vector value).

In the cases described above, an output property value space is larger than an input property value space such that a plurality of output property values may be selected for an input property value and still result in an output with a measurable metric value for the property within a range associated with the input property value (a so-called property paramer set). Certain examples described herein use this feature to allow data to be embedded in a printed output. In particular, certain members of the paramer set (e.g. certain output property values) may be members under a first set of inspection conditions and not paramers under other sets of inspection conditions. These inspection conditions may, amongst others, comprise particular combinations of: lighting conditions, temperature conditions, mechanical conditions, chemical conditions and/or electro-magnetic conditions. However, under a second set of inspection conditions these members may not be members of the paramer set, e.g. they may differ from a reference metric value by a predefined amount that is greater than a threshold than defines membership of the set. The size of the set of paramers may depend on the input property value, e.g. there may be more redundancy for particular input property values.

For example, a "blue" voxel of a printed cube may be printable with two material compositions that have a "blue" color. At a low temperature (i.e. a first set of inspection conditions) both blue material compositions may have a common resistance (e.g. a high resistance of 100k ohms). However, one of the material compositions may act as a thermistor; as such at a high temperature (i.e. a second set of inspection conditions) the two blue material compositions may have different resistances: one blue material composition may maintain the previous resistance value (e.g. 100k ohms) but the other blue material composition may have a lower resistance of 30k ohms due to the rise in temperature. As such the second blue composition is only an electrical paramer under the first set of inspection conditions; under the second set of inspection conditions it is no longer a paramer. For example, if the input property value is a predefined resistance of 100k ohms under the first set of conditions, both blue material compositions have a resistance difference of 0 under these conditions. However, only the first blue material composition has a resistance difference of 0 under the second set of inspection conditions; the second blue material composition has a resistance difference of 70k ohms under those conditions. This result may be used to embed data, e.g. under the first set of conditions all that is seen is a blue cube with a resistance of 100k ohms, however under the second set of conditions certain portions of the cube will have a resistance of 100k ohms and other portions will have a resistance of 30k ohms. The pattern of resistance differences under the second set of inspection conditions may thus be used to embed data.

Moving to a general case, certain examples described herein use sets of paramers to determine an appropriate property mapping for one or more portions of the printed output. The paramers may represent different printing material combinations, for a spatial element of the printed output corresponding to a content element of inputted content data, under a first predefined set of conditions. Content data may be data that represents a printed output, for example a two-dimensional or three-dimensional model of a two-dimensional or three-dimensional object, respectively, to be printed or generated by a printing device. A content element may be, for example, a subset of the content data that corresponds to a part of the representation of the model of the printed output e.g. an area on a print substrate or a sub-volume comprised within the volume of a three-dimensional object to be printed. For example, a content element may be a property value associated with a pixel or a voxel. Under the first predefined set of conditions the paramers may have a given set of output property values. Under a second predefined set of conditions the same set of output property values may result in different measurable properties. This difference may be used to encode or embed data. Generating an accurate measurement of such a difference, based on parameric or metameric properties, allows insight into an extent of the paramer- or metamer-space. This may be include information about the nature of the paramer or metamer space that is initially unrelated to that used in a data embedding process. For example, understanding paramer space, e.g. groupings within multiple dimensions, may enable a range of monitoring applications beyond a robust authentication process. Certain examples described herein relate to encoding data, detecting data, and generating the property mappings for at least encoding.

Figure 1:
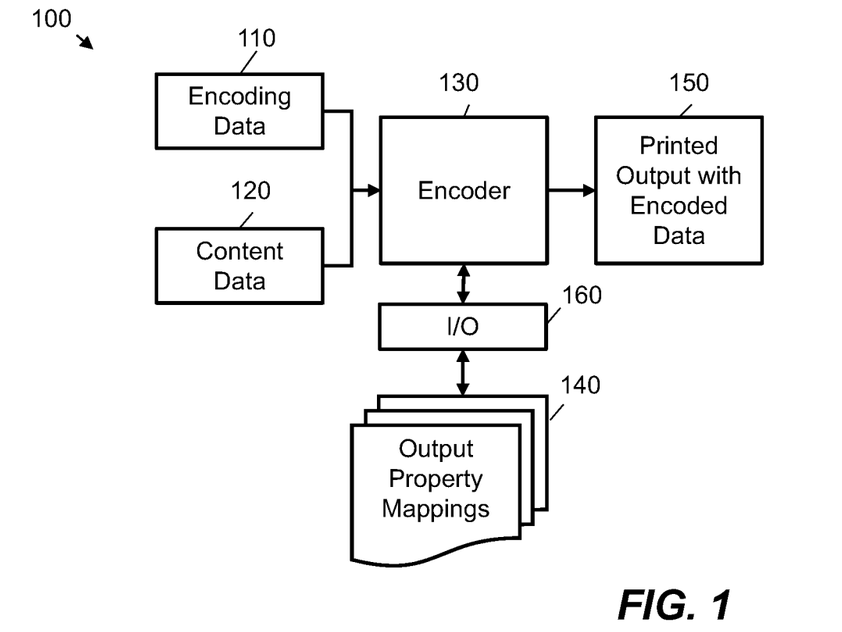
FIG. 1 is a schematic illustration of a system for encoding data in a printed output according to an example.

FIG. 1 is a schematic illustration showing an encoder system 100 according to an example. This encoder system 100 may be used to encode data 110 within content data 120 during the production of a printed output 150. The encoder system 100 comprises an encoder 130 to receive the data to be encoded 110 and the content data 120. The encoder 130 is arranged to access a plurality of output property mappings 140 via an interface 160. Each output property mapping 140 provides a mapping of at least one property value from the content data 120 to an output value for a probabilistic distribution of a set of output material compositions for a spatial element of the printed output. In particular, the encoder 130 is arranged to select an output property mapping from the plurality of output property mappings for a portion of the printed output according to a data value from the data to be encoded 110. The selected output property mapping is then used by the encoder 130 to generate an output property value for the spatial element in accordance with the content data for that spatial element. The output property value is used, e.g. by a multi-dimensional printing device, to generate printed output 150 with encoded data.

In one case, content data 120 may be defined with reference to a given area or volume. For example, content data 120 may comprise an image of X by Y pixels or a volume of X by Y by Z voxels. In this case, the content data 120 may be defined with reference to spatial elements (pixels or voxels) of a first resolution. Content data 120 may comprise at least one input property value for each spatial element, e.g. an RGB value for each pixel or at least one material property value for each voxel. In a three-dimensional case, voxels that do not comprise a material property value or that are indicated as "blank" or "empty" may not form part of a three-dimensional printed output, e.g. may result in empty space. Similarly, an absence of a pixel value may indicate that no printing fluid or material is to be deposited on a print substrate. In certain cases, content data 120 may comprise geometric definitions with associated material property values, e.g. vector-based shapes in two or three dimensions. In one case, such vector-based representations may be pre-processed to generate a rasterized representation, e.g. a representation based on repeated rectangular or cubic units within a defined grid. In one implementation pixel or voxels may have an associated n-tuple defining at least one material property. For example, a voxel definition for content data 120 may comprise: [{Voxel: x, y, z}; {Color: r, g, b}; {Resistance: o}; {Tensile_Strength: s}; {Thermal_Conductivity: t}]. The resolution of the content data 120 may be the same or different to a print resolution of the printed output 150. If the resolution of the content data 120 differs from that of the print resolution of the printed output 150 it may be up or down scaled accordingly.

In the present example, output property values are defined as a probabilistic distribution of a set of output material compositions for a spatial element of the printed output. These spatial elements may comprise output pixels or voxels, e.g. as discussed above. The probabilistic distribution may be defined as a vector, wherein each component in the vector represents an available output material composition, including a "blank" or "empty" state. The probabilistic distribution of a set of output material compositions for a spatial element of the printed output may comprise at least one of: an printing-fluid-primary-overprint area-coverage vector that instructs a deposition of printing fluid, e.g. ink, in a unit area of a print medium (e.g. an NPac vector); and a material-volume-coverage vector that instructs deposition of material in a unit volume of three-dimensional printed output (e.g. an MVoc vector).

For a two-dimensional case, a "material composition" may comprise a printing fluid or combination of printing fluids that are deposited on a print substrate. For a three-dimensional case, a "material composition" may comprise a production material or combination of production materials that are arranged in three-dimensions. In one case, they may comprise agents that are deposited on a layer of powdered substrate, wherein the combination of agent and substrate is cured to produce a solid material composition. In both cases, the set of output material compositions comprises $L^k$ elements, wherein k is the number of materials available for printing, and L is the number of discrete printing states. For example, in a case where the printed output is two-dimensional, a material may comprise ink with k=2 types available (e.g. C and M) and there may be two printing states, i.e. L=2 states (e.g. 0 or 1 ink drops as found in a binary printer). In this case, the set out output material compositions comprises $2^2=4$ elements and the output property vector comprises 4 vector components: [Z, I1, I2, I1I2], where Z="blank" or "empty" and "I1I2" represents a combination of one drop of ink 1 and one drop of ink 2. Similarly a three-dimensional case may relate to the extrusion of two different polymers P1 and P2. There may also be two printing states, e.g. a deposit or no deposit of the polymer at a three-dimensional location. As such, the set out output material compositions comprises $2^2=4$ elements and the output property vector comprises 4 vector components: [Z, P1, P2, P1P2]. In the example of FIG. 1, each of the $L^k$ elements has an associated probability value representing a distribution of a given material composition for a defined spatial element. For example, an output property value of [0.2, 0.1, 0.3, 0.4] may represent, for a given pixel or voxel, 20% empty or blank, 10% I1 or P1, 30% I2 or P2 and 40% a combination of I1 and I2 or P1 and P2. As may be imagined, when multiple materials are used and there are multiple printing states (e.g. representative of different quantities of materials that may be deposited by a printing apparatus such as a multi-drop inkjet printer), the dimensionality of the output property value space may be very large, allowing for the existence of multiple parameters.

The plurality of output property mappings may be implemented by a defined function and/or a predefined look-up table. Each output property mapping maps an input property value, e.g. a content data value associated with an input pixel or voxel, to an output property value, e.g. a vector of component values as described above that is associated with an output pixel or voxel. In the example of FIG. 1, an output property mapping is selected based on a data value to be encoded from data 110. In one case, the data to be encoded 110 may be defined at the same resolution as the content data 120; in other cases it may apply to a portion of the content data 120 and/or be scaled from a supplied resolution to a resolution that matches that of the content data 120.

For example, each property mapping may map an input RGB color value to an output material composition vector. A given output print resolution pixel or voxel may have a corresponding input pixel or voxel with content data 120 indicating a value of [155, 0, 20]. The data to be encoded 120 may be binary (e.g. have a value of 0 or 1) and for a pixel or voxel corresponding to the input pixel or voxel have a value of [1]. In this case, the value of "1" instructs the encoder 130 to select a first output property mapping that has an entry of [{155, 0, 20}:{0, 0.5, 0.5, 0}] and so [0, 0.5, 0.5, 0] is used to instruct the printing of the particular pixel or voxel. A neighboring pixel or voxel may have the same content data value. However, it may have either no data to be encoded or a data to be encoded with a value of [0]. This absence of a value or value of 0, in this example, instructs the encoder 130 to select a second output property mapping that has an entry of [{155, 0, 20}:{0, 0, 0, 1}] and so [0, 0, 0, 1] is used to instruct the printing of the particular pixel or voxel. In this case, under a first set of conditions, the output property values of [0, 0.5, 0.5, 0] and [0, 0, 0, 1] may result in the same measurable properties (e.g. in the first case 50% of material 1 and 50% of material 2 is instructed, whereas in the second case 100% of a combination of material 1 and 2 is instructed). However, under a second set of conditions, these output property values may result in different measurable properties (e.g. a different measurable color, strength or conductivity value). For example, the output property value [0, 0.5, 0.5, 0] may be halftoned as alternating pixels or voxels of material 1 and material 2; whereas the output property value [0, 0, 0, 1] may be halftoned as drops of both material 1 and 2 in the pixel or voxel. The second case results in a mixture that may, e.g. visually or chemically, differ from the first case, enabling the data value of 1 to be encoded and detectable under the second set of conditions.

Figure 2:
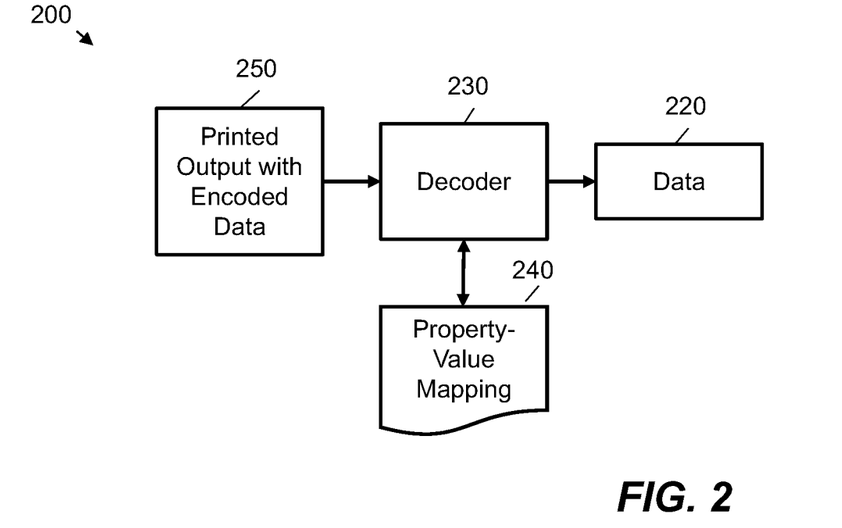
FIG. 2 is a schematic illustration of a system for decoding data embedded in a printed output according to an example.

FIG. 2 is a schematic illustration of a decoder system 200 according to an example. The decoder system 200 is arranged to decode data that is embedded in a printed output, e.g. by the encoder system 100 of FIG. 1. The decoder system 200 comprises a decoder 230 that is arranged to obtain a representation of the printed output with encoded data 250. The representation of the printed output with encoded data 250 may be obtained by a device, such as a charge-coupled device (CCD) array, a two- or three-dimensional scanner, or a measurement device such as a magnetometer. In an example wherein the printed output is two-dimensional, the printed output may be captured from a displayed output, e.g. a version displayed on a light-emitting diode (LED) display. In an example wherein the printed output is three-dimensional, an image of the printed object may be captured or the object may be placed into a measurement chamber. The obtaining or measurement device may form part of a portable computing device such as a smartphone. The printed output with encoded data 250 is obtained at least under a predetermined set of conditions, wherein said conditions represent the second set of conditions described above. For example, the decoder 230 may be arranged to obtain a representation of the printed output, such as a heat signature of the printed output, while a printed output is illuminated by a particular illuminant or wavelength of light (e.g. ultraviolet, infrared). In another example, a representation of the printed output may be obtained by measuring a physical property such as spectral reflectance or electrical resistivity of the printed output. In certain cases, a representation of the printed output with encoded data 250 may also be obtained under a first predetermined set of conditions, e.g. for use in comparison with the representation of the printed output obtained under a second predetermined set of conditions.

The decoder 230 is arranged to determine a property metric for one or more spatial elements of the representation of the printed output 250. In some examples, this property metric may be associated with color and/or spectral properties of a measured spatial element of the printed output 250. For example, in a case with a two-dimensional printed output 250, the decoder 230 may be arranged to determine RGB and/or XYZ pixel values for an area of a substrate comprising printed output 150. In this case, the decoder 230 is then arranged to use a color-metric-to-data-value mapping 240 to determine data values of any data embedded in the image 250. In another, three-dimensional case, the metric may relate to capacitance. In a case where binary data is encoded in the printed output 250 this may involve comparing a representation of the printed output 250 obtained under a first set of conditions with a representation of the printed output 250 obtained under a second set of conditions; in this case, a difference in capacitance between volume elements (or 'voxels') of the representation of the printed output 250 above a threshold may indicate a data value of 1, while a difference in capacitance under the threshold may indicate a data value of 0. In a case where N-ary data is encoded, a magnitude of a capacitance difference may be quantized according to a predetermined quantization scheme, wherein each range in the quantization scheme is mapped to a different data value. In a case where a representation of the printed output 250 under the second set of conditions is obtained, a predefined 'key' region may be included in the printed output 150. In this region, a known data value, e.g. 0, may embedded and used as a comparison value for a known three-dimensional block of substantially equal capacitance. In another case, particular capacitance value ranges under the second set of conditions may be mapped directly to data values, e.g. via a look-up table.

In any case, the decoder 230 is able to extract the data values of the encoded data and output these as decoded data 220. Although the property-metric-to-data-value mapping 240 is shown as a discrete entity in FIG. 2, in certain implementations this mapping may be implemented by pre-configured routines, e.g. similar to those described above, that are run by the decoder rather than any explicit value look-up.

In one case, instead of detector 230, the human visual system may be used, e.g. data 110 may be imperceptible when visually inspected under a first set of conditions but perceptible when inspected under a second set of conditions.

In another case, printed output 150 may comprise an existing data-encoding printed output, for example a known data-bearing halftone or Quick Response (QR) code, that is enhanced by the N-ary encoding described in some of the examples. In this case, the examples described herein may extend a known binary data-bearing halftone or QR code to an N-ary case with multiple property value encodings for multiple data values. In this case, the detector 230 may comprise an adapted version of a known detection mechanism, e.g. a detector for known data-bearing halftone or QR codes, wherein the adaptation allows detection of property value difference, e.g. compared to a binary case.

One or more of the encoder 130 and the decoder 230 may comprise one or more processors that form part an embedded computing device, e.g. the encoder 130 may be adapted for use in controlling an additive manufacturing system and the decoder 230 may form part of a data reader (e.g. a hand-held device or as part of a computer system). They may also comprise volatile and/or non-volatile memory, e.g. a non-transitory storage medium, arranged to store machine readable instructions, e.g. in the form of firmware. In one case, the encoder 130 may form part of a "print driver" for a "3D printer", which is implemented on a client device; this may be the case if the client device is arranged to send a "3D print job" to an additive manufacturing system for production of the printed output.

As discussed above, in one case, the output property value may comprise a material volume coverage (MVoc) vector. An MVoc vector represents a probabilistic distribution of materials available to a printing system, for example an additive manufacturing system for production of a three-dimensional object. In one case, each vector represents a proportional volumetric coverage of materials available for production of the three-dimensional object and combinations of said materials. For example, for k materials available for production of the three-dimensional object and L discrete material formation states for said materials, the material coverage vector comprises $L^k$ vector components, each vector component having an associated probability value. In this case, the discrete deposit instructions may comprise production instructions from a set of L*k available instruction values, each element at a production resolution having one of L material formation state instructions for each of said k materials (e.g. instructions for inkjet printheads relating to each agent or object material that indicate a number of drops of agent or material to deposit at a particular z-layer in an n-drop inkjet deposit system). The materials and material combinations defined by the material volume coverage vector may be associated with a number of different material types, e.g. build materials, finishing materials, support or scaffolding materials, agents and powders, including separate use of materials, joint use of materials, and an absence of any materials. In certain cases, a material may be modified with photo-luminescent, quantum-dot or nanoparticle additives that modify a light spectrum as measured from the output. For example, these additives may emit a narrow-band of specific wavelengths anywhere in the visible range of wavelengths when illuminated by electromagnetic radiation comprising particular wavelengths or wavelength ranges, including generic, common light sources. This may be used to produce paramers that have particular fluorescence or luminescence properties under a second set of inspection conditions.

Figure 3:
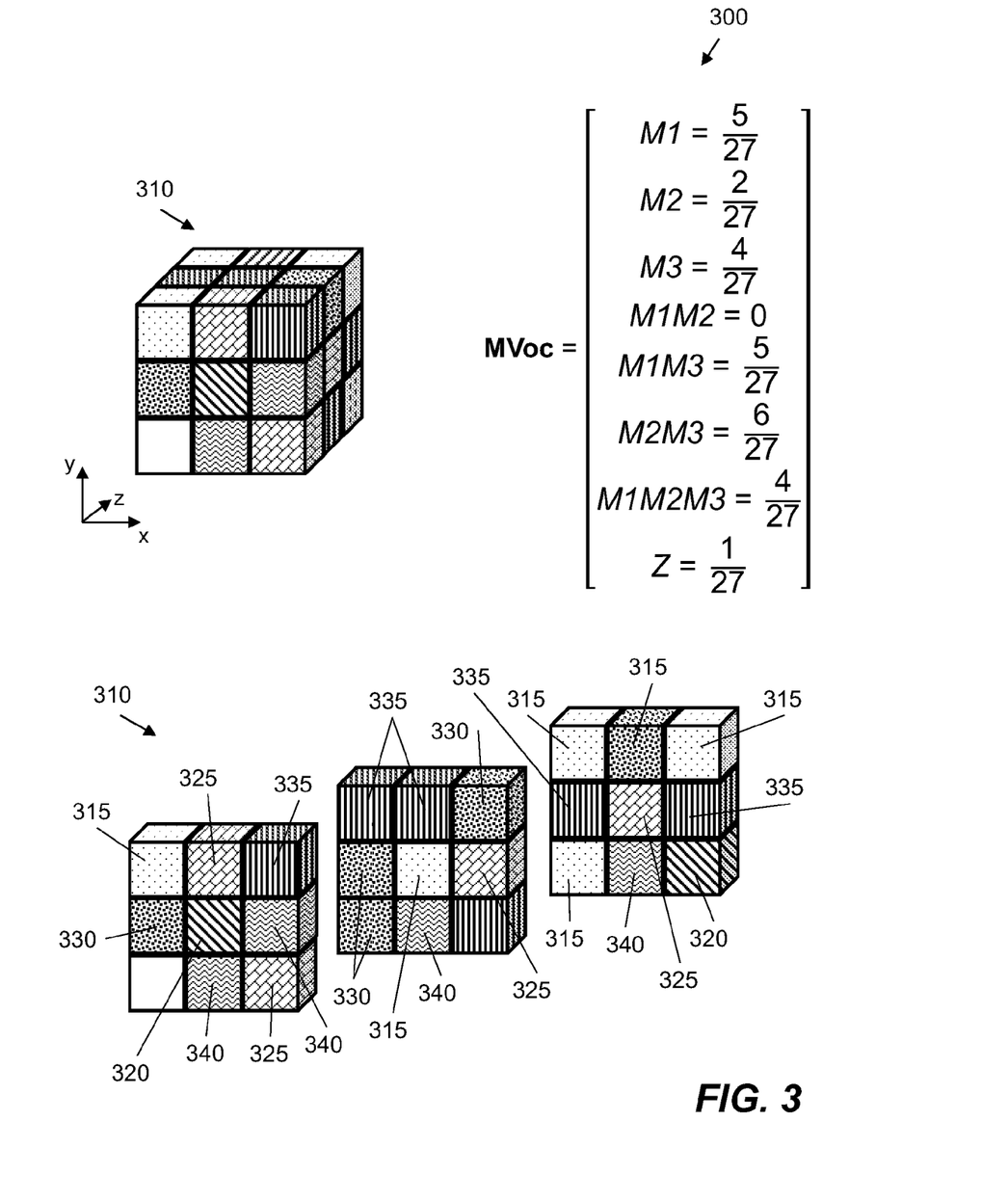
FIG. 3 is a schematic illustration of a material-volume-coverage vector according to an example.

To explain the components of a material volume coverage vector, a simple example may be considered, with reference to FIG. 3. In this simple example, a printing device can use three materials to generate a three-dimensional object: M1, M2 and M3. These may be fluid build materials that are deposited on a substrate or platen, e.g. excreted or ejected molten polymers that are built up in z-layers, or they may comprise deposit-able colored agents that are deposited on at least one layer of powdered build material. In the latter case, in a produced three-dimensional object, each "material composition" may correspond to a cured combination of the deposit-able agent and a powdered build material, although if a single powdered build material is used reference may be made to the agents alone (e.g. a component relating to A1 may be shorthand for a combination of agent 1 and a given powdered substrate). In the former case, in a produced three-dimensional object, each "material composition" may correspond to a solidified portion of excreted or ejected polymer. In any case, each "material" is deposit-able by an additive manufacturing apparatus to generate a defined volume (e.g. at the production resolution) of an output three-dimensional object.

In this simple example, if the printing device can deposit discrete amounts of each material, e.g. in binary deposits, there are eight different material combination states: a first state for the deposit of M1 without M2 or M3; a second state for the deposit of M2 without M1 or M3; a third state for the deposit of M3 without M1 or M2; a fourth state for the deposit of both M1 and M2 without M3, e.g. M2 deposited over M1 or vice versa; a fifth state for the deposit of both M1 and M3 without M2; a sixth state for the deposit of both M2 and M3 without M1; a seventh state for the deposit of all three materials M1, M2 and M3, again deposited in any order; and an eighth state for an absence of any of the materials M1, M2 and M3, e.g. "blank" (Z) or an inhibitor. In this case, the material volume coverage vector, MVoc 300 in FIG. 3, has eight vector components: [M1, M2, M3, M1M2, M1M3, M2M3, M1M2M3, Z]. In the case of the last vector component, "blank" or "Z" may represent "empty" or an absence of materials in a processed layer, e.g. if agents are deposited on layers of build material this may denote an absence of build material for the processed layer, even though the build material may not be removed until the complete object has been produced. In certain cases, a "blank" or "empty" value may instruct the deposit of a coalescence or curing inhibitor to provide higher fidelity output.

FIG. 3 also shows for this example a representative three-by-three-by-three voxel volume 310 where all twenty-seven voxels have the same MVoc vector: vector 300. The MVoc vector 300 defines the probability distributions for each material composition for each voxel, e.g. a likelihood that each material composition is to be placed at the voxel location, which may defined by a three-coordinate vector [x, y, z] in three-dimensional Cartesian space. Hence, in the example print output 310, which is also shown in an 'exploded' view in FIG. 3 to show all twenty-seven voxels of the printed output separated along the z-axis, the MVoc vector 300 may result in: five voxels of the first material M1 (315); two voxels of the second material M2 (320); four voxels of the third material M3 (325); no voxels of the first material M1 and the second material M2 (M1M2); five voxels of the first material M1 and the third material M3 in combination (M1M3) (330); six voxels of the second material M2 and the third material M3 in combination (M2M3) (335); four voxels of the first material M1 and the second material M2 and the third material M3 in combination (M1M2M3) (340); and one blank voxel of no material (Z) (345). For example, the example print output 310 may be generated by halftoning the MVoc vector 300 to generate discrete print instructions for an additive manufacturing system. Generally, the print output of a given volume is generated such that the probability distributions set by the MVoc vectors of each voxel are fulfilled. Halftoning may be applied using a two or three-dimensional halftone threshold matrix and/or a process of error diffusion. As such, an MVoc vector is representative of the material overprint statistics of a given volume. Although this simplified system of three materials having binary material formation states is used for ease of explanation, other systems may be used.

An example of how a halftoning operation may be performed on a material volume coverage (MVoc) vector will now be briefly described. For ease of explanation, a two-material additive manufacturing system will be used. For this system an output property mapping results in an MVoc vector value of [M1:0.2, M2:0.1, M1M2:0.5, Z:0.2] at [x1, y1, z1]. In relation to this value, a halftone threshold value of 0.5 is retrieved (on a [0 to 1] floating point scale). For example, a random threshold may be used or a threshold value may be retrieved from a spatial location in a three-dimensional halftone matrix that corresponds the same spatial location as the MVoc, e.g. [x, y, z]. In this example, the MVoc is first converted into a cumulative probability distribution: [M1:0.2, M2:0.3, M1M2:0.8, Z:1.0] thereby creating intervals [0 to 0.2] corresponding to M1, (0.2 to 0.3] corresponding to M2, (0.3 to 0.8] corresponding to M1M2 and (0.8 to 1.0] corresponding to Z, where "(" denotes an open interval and "]" a closed interval. The threshold value, e.g. 0.5, is then compared against these intervals. In this specific case, 0.5 falls in the interval of (0.3 to 0.8], resulting in M1M2 being chosen at location [x1, y1, z1]. For example, this may result in print instructions that instruct printheads respectively configured to deposit materials M1 and M2 to both fire a drop onto a print-resolution area of powdered substrate corresponding to location [x1, y1] in a z-axis layer corresponding to [z1].

When using an MVoc representation in three dimensions, or a corresponding NPac representation in two dimensions, a paramer set, e.g. representing vectors that substantially match in measured metric value under nominal conditions (i.e. wherein a difference between measured metric values is below a predefined threshold), may be evaluated and one paramer may be selected that minimizes a metric under nominal conditions but that is within a different metric range under different conditions. Where detectable differences exist under two sets of conditions for one set of vectors (e.g. one subset of paramers under nominal conditions), yet do not exist for a second set of vectors (e.g. a subset that remain paramers under both conditions), this difference in behaviors can be used to encode information in a printed output. For example, the first set of vectors may be used to encode information through, amongst others, one or more of data-bearing halftones, barcodes, QR codes, text, and imagery.

Figure 4:
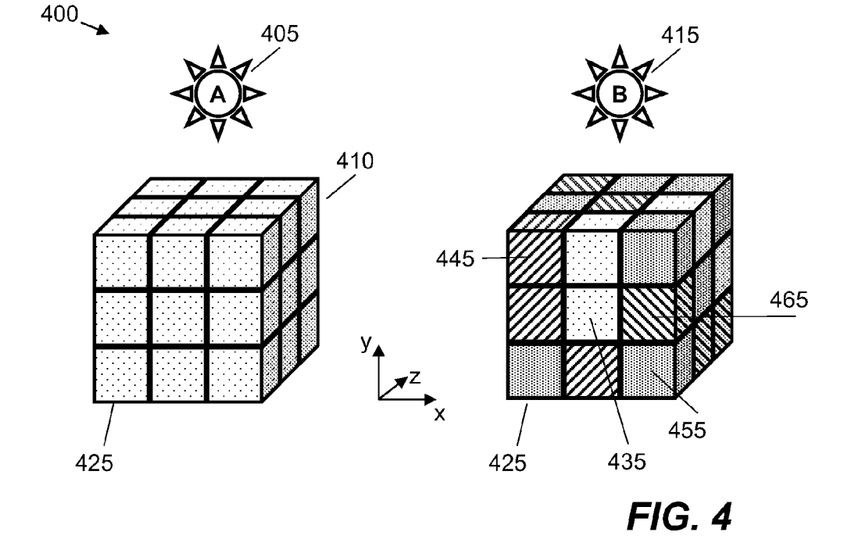
FIG. 4 is a schematic illustration of a printed output under two different conditions according to an example.

FIG. 4 is a schematic diagram showing an example 400 of information embedded or hidden in a three-dimensional printed output. FIG. 4 shows two versions of the printed output under different inspection conditions. In this example, the inspection conditions are illumination conditions corresponding to a first illuminant 'A' 405 and a second illuminant 'B' 415. Under the first illuminant 405 a portion of a printed output 425 appears to have a uniform property value, represented by the same patterned voxels, e.g. the same color when viewed by a human observer, or the same spectral reflectance etc. Objectively this constraint may be indicated by a measured property difference between adjacent voxels that is below a threshold, wherein this threshold may be indicative of a perception level or a machine tolerance indicating similarity (e.g. a delta E measurement below a predefined threshold). However, under the second illuminant 415 the portion 425 has a number of spatial elements of different property values.

In FIG. 4, the spatial elements of the printed output comprise voxels of a cube. There are three z layers of nine voxels in the x-y plane. The voxels will be referred to in (x,y,z) Cartesian coordinates, with the lower front left hand corner as voxel (1,1,1), the other voxels having values in the range (1-3, 1-3, 1-3). The left-hand side portion of the Figure shows illumination of the cube under the first illuminant 405; the right-hand side portion of the Figure shows illumination of the cube under the second illuminant 415.

In the right-hand side portion, it may be seen how a first set of voxels 435 do not change (e.g. as detected by a measured property value) under the second illuminant 415: (2,2-3,1), (3,3,2), and (3,2,3). In the present case, there is no difference in the material property when changing from the first illuminant to the second illuminant. These voxels may encode a data value of 0 (alternatively, they may represent printed output areas that do not contain encoded information). Although this example shows no change for these voxels in other cases there may be a change, however this change may differ from that of voxels comprising encoded data.

Turning again to the right-hand side portion of FIG. 4, there are a second set of voxels 445 that change in property value under the second illuminant 415: (1,2-3,1), and (2,1,1). This change is in relation to the property values of these voxels under the first illuminant 405. The change in property value may be measured and fall within a first range. These voxels may encode a data value of 1. There are also a third set of pixels 455 that change in property value under the second illuminant 415: (1,1,1), (3,1,1), (3,3,1), (1,3,2), (2-3,3,3) and (3,2,2). These change in property value in a different manner to the second set of voxels 445, e.g. may have a measured change in property values that fall within a second range, and may encode a data value of 2. For example, in the case that the property values are color, they may have a different color metric such as lightness and/or hue. Finally, in FIG. 4, there are a fourth set of voxels 465 that again change in property value under the second illuminant 415: (3,2,1), (3,1,2-3), (2,3,2) and (1,3,3). These change in property value in a different manner to the second set of voxels 445 and the third set of voxels 455. Again the different manner may be represented by a different measured property metric value. The change in property value may be measured and fall within a third range. The fourth set of voxels 465 may encode a data value of 3. In the case that the property values are colors, a color metric need not be limited to properties of colors in the visible spectrum; for example, it may also relate to measured infra-red and/or ultra-violet properties.

FIG. 4 thus demonstrates a simple example of encoding information in a printed output. In this case, data is encoded in a 4-ary scheme: four different data values 0 to 3 may be encoded. The printed output portion 425 may, for example, hide a QR code under normal illumination that is visible under a custom illumination (e.g. a flash of a portable computing device such as a smartphone). It should be noted that the physical composition of the printed output 410 does not change between the two sets of conditions; rather the difference arises due to the fact that a detectable change in property value is dependent on the conditions under which the printed output is observed, captured or measured, such as illumination. In one case, voxels 445 to 465 may be printed with materials that contain additives that alter a property such as reflectance and/or an emission spectrum under different conditions. While FIG. 4 shows an N-ary case, a binary case may be implemented in a similar way, e.g. by configuring voxels 445 to 465 to have a common property value under the second illuminant 415.

FIG. 4 shows an example wherein the first and second set of inspection conditions relate to illumination. Other examples of a second set of conditions, for inspection of the printed output, may comprise: viewing under magnification, wherein a visual property such as color is compared between voxels or pixels; micro-photographic measurement, wherein color differences are determined between pixels/voxels; spectrophotometric measurement; lighting by an increased amount of ultraviolet light, infrared light or any specific, non-standard light; exposing at least part of the printed output to a chemical composition, wherein particular voxels/pixels may change in their chosen physical property values e.g. may dissolve or disassociate from the printed output; applying mechanical stress; applying mechanical strain; heating the printed output; making measurements e.g. of electrical conductivity or electrical resistance, or a magnetic signature of the printed output.

Examples of property values that may be determined or measured under a set of conditions may comprise, amongst others: color, spectral reflectance, electromagnetic emission or absorption (this may be 'counts' of a specific wavelength or frequency of electromagnetic wave emitted or absorbed, or could involve analysis of an emission spectra across multiple wavelengths or frequencies); electrical conductivity or resistance; magnetic susceptibility; and magnetic permeability.

Figure 5:
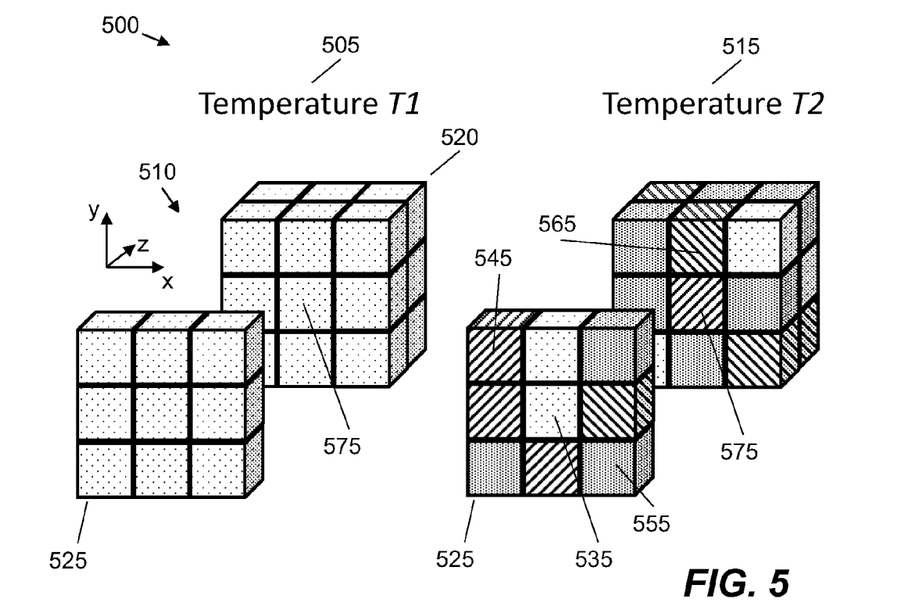
FIG. 5 is a schematic illustration of a printed output under two different conditions according to another example.

FIG. 5 shows another example 500 of embedded data. Similarly to FIG. 4, FIG. 5 shows two versions of a printed output 510 under different inspection conditions. In this example, the inspection conditions are related to temperature: a first temperature 'T1' 505 and a second temperature 'T2' 515. Under the first temperature 505 a portion of a printed output, shown as separate layers 520 (of nine voxels) and 525 (of eighteen voxels) in the z axis, appears to have a uniform property value, represented by the same patterned voxels, e.g. the same electrical conductivity, plasticity etc. Objectively this behavior may be indicated by a measured property difference between adjacent voxels that is below a threshold, wherein this threshold may be indicative of a perception level or a machine tolerance indicating similarity. However, under the second temperature 515 the layers 520 and 525 have a number of spatial elements of differing property values. For ease of explanation each of these elements will be referred to as a 'voxels', however, again these need not represent the resolution of either a printed output or acquisition device. In addition to voxels 535, 545, 555, and 565 changing in property value in a similar way to the voxels 435, 445, 455, and 465 in the example shown in FIG. 4, respectively, in FIG. 5 voxel (2,2,2) (575) changes in property value between the two temperature conditions, i.e. voxels located within the interior of printed output 510 have a different property value, such as measured electrical resistance, under the second temperature T2 compared to when under the first temperature T1. Thus, in order to possibly detect and maybe decode data that is embedded or encoded in an interior voxel of the printed output, such as voxel 575 in FIG. 5, the second set of inspection conditions may comprise accessing the interior of the printed output and applying the second set of conditions to said interior. For example, in the case shown in FIG. 5, this may comprise accessing the interior of the printed output destructively by e.g. cracking, slicing, prying open the printed output 510, or non-destructively by e.g. inserting a probe into the printed output. It may also comprise immersing the interior and/or a portion of the interior in a particular chemical fluid. The second set of inspection conditions, such as exposing the printed output to the second temperature T2 in FIG. 5, are applied to the accessed interior. In one case, under the second set of inspection conditions the printed output may have an exterior appearance that does not differ from the first set of inspection conditions (or wherein voxels that encode data and voxels that do not encode data differ in a similar manner); as such the embedded or encoded data may be read by accessing the interior of the printed output. This may provide a useful security feature for authenticating genuine objects, i.e. produced objects that comprise the encoded data are seen as genuine. For example, the printed objects 410 or 510 may comprise pharmaceutical drugs that are manufactured by three-dimensional printing—drugs that have particular interior property values under a second set of inspection conditions may be deemed safe.

A number of example methods will now be described with reference to FIGS. 6 to 7. These methods may be used to configure and/or operate one or more of the encoder 130 of FIG. 1 and the decoder 230 of FIG. 2. In two-dimensional cases, these methods may be used to encode and/or decode continuous-tone-like information in printed content. In three-dimensional cases, these methods may be used to encode and/or decode data in voxels of a three-dimensional object. In certain cases, custom modified materials with additives may be used. These additives may be configured to react under certain conditions such as illumination by visible light or ultraviolet or infrared light or application of a voltage, such that, in certain examples, visual, machine-readable, or measurable information can be encoded in a multi-dimensional printed output and reliably detected.

Figure 6:
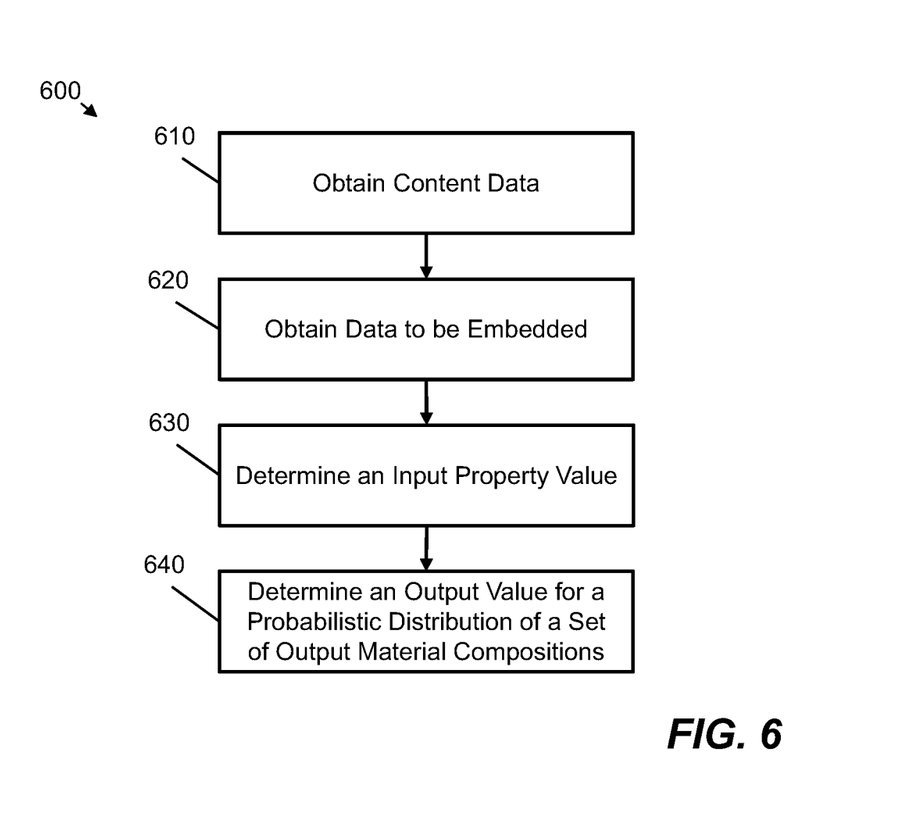
FIG. 6 is a flowchart showing a method of embedding data in a printed output according to an example.

FIG. 6 is a flowchart showing a method 600 of embedding data in a printed output having at least two-dimensions.

At block 610, content data for the printed output is obtained. The content data may comprise a digital representation of the printed output, for example a 'mesh' graphic representing a three-dimensional object to be printed by a printing device such as an additive manufacturing device or "3D printer".

At block 620, data to be embedded in the printed output is obtained. In certain examples, "data" to be embedded or encoded may not necessarily comprise data to be reconstructed. For example, the data to be embedded may comprise an image that is viewable under the second set of conditions and/or may comprise machine-readable image portions that facilitate image processing, or may comprise a physical change in the printed output such as a change in plasticity in particular locations or portions of the printed output. It may also comprise a particular watermark or the like. In a simple case, the data to be embedded may comprise a single value (e.g. binary '1' or 'embed') for a set of pixels or voxels forming at least part of a multi-dimensional printed output.

At block 630, an input property value for a content element from the content data is determined. For example, this may be determined from data relating to a digital representation of an output to be printed, such as determining an electrical conductivity value for a volume element of a three-dimensional digitally-rendered representation of the printed output, wherein the representation comprises electrical conductivity values for a set of volume elements. In one case, an input property value may be provided for each spatial element making up the content data; in other cases an input property value may be commonly assigned to a plurality of spatial elements. Other examples of input property values that may be determined from the content data have been discussed previously e.g. color, spectral reflectance, strength, etc.

At block 640, an output value for a probabilistic distribution of a set of output material compositions for at least one spatial element of the printed output is determined. The spatial element of the printed output corresponds to the content element, and the output value for the probabilistic distribution of a set of output material compositions is determined based on the data to be embedded and the input property value. For a number k of materials available for printing, and L discrete printing states, the set of output material compositions comprises $L^k$ elements. Each element has an associated probability value, and responsive to the spatial element being used to embed data, the output value has an associated first set of properties under a first set of inspection conditions and an associated second set of properties under a second set of inspection conditions, the first set of properties and the second set of properties differing by at least a predefined property distance metric value. In an example, where there are three materials available for printing, and two printing states i.e. a binary system, the set of output material compositions would comprise eight elements, each with an associated probability value. Each element may correspond to a particular combination of the available materials, and the associated probability value of each element may correspond to the probability of a material combination being deposited in a printing state at a location. For example, a particular property mapping may be selected based on the value of the data to be embedded for a particular spatial element. This block may be repeated for a plurality of spatial elements to encode multiple data values.

In certain cases, if a spatial element is not being used to embed data, the output value has an associated third set of properties under the first set of conditions and an associated fourth set of properties under the second set of conditions, the third set of properties and the fourth set of properties differing by less than the predefined property distance metric value. The third set of properties and the first set of properties may also differ by less than the predefined property distance metric value. The sets of properties may comprise properties such as color, spectral reflectance, electrical and magnetic properties etc. as previously discussed. In other words, a property mapping may be selected, if data is not to be encoded, such that an output property value differs from an output property value for encoded data, even though an input property value may be the same. The differing output property value then instructs a differing material composition of the printed output such that, under a second set of inspection conditions, embedded data value is detectable in comparison with either other embedded data values or an absence of embedded data.

In certain examples, the method may comprise halftoning the output value to generate printing instructions for one of a two-dimensional and three-dimensional print output, e.g. as described with reference to FIG. 3 above. The printing instructions may instruct a discrete printing state for at least one of the materials available for printing. In these examples, the method may also comprise generating the print output based on the printing instructions. The print output may be generated by e.g. a "2D printer" or a "3D printer" (i.e. an additive manufacturing device).

In certain examples, the printed output associated with method 600 may be three-dimensional. In these examples, the spatial element may be a volume element such as a "voxel", and the probabilistic distribution of the set of output material compositions may be a material-volume-coverage (MVoc) vector representing a probabilistic volumetric distribution, such as 300 in FIG. 3.

In certain cases, the spatial element may be a volume element located within an interior of the printed output. An example of this may be the voxel 575 within printed output 510 shown in FIG. 5 and discussed previously. In these cases, the second set of inspection conditions may comprise accessing the interior of the printed output and applying the second set of inspection conditions to said interior. For example, data may be encoded in a property change of a voxel located inside a printed object under a change of conditions, the voxel not having a surface forming part of an exterior surface of the printed object. The second set of conditions may therefore comprise accessing an interior portion or surface of the printed output, for example destructively by force or other means. A further set of conditions may then be applied to the printed output in order to ascertain property changes of exposed voxels.

In certain examples, a number of operations may be undertaken to configure the embedding method of FIG. 6 or the encoder 130 of FIG. 1. This may be applied to both two-dimensional and three-dimensional implementations. For example, a three-dimensional case will be described here.

Firstly, for at least one property of a printed output associated with a first set of inspection conditions, a set of paramers for the property is determined. A paramer set may comprise, for a given input property value under the first set of inspection conditions, material-volume-coverage (MVocs) vectors having output property values that differ by less than a predetermined threshold amount under the first set of inspection conditions. In these examples, a paramer set may be determined by firstly modelling how different combinations of available printing materials (characterized by MVocs) map to a particular property e.g. color, value of electrical resistance etc. This may also take into account other material properties e.g. mechanical ones such as tensile strength, density, etc.

Given a measured mapping, or 'model' of how MVoc vectors and a property of the resulting output are related, 'MVoc space' may be sampled to predict a measured property value. MVoc space in this instance comprises an $L^k$ dimensional space with defined ranges for each of the vector components. A number of test objects may be produced with a variety of MVoc values and subsequently measured to build up a series of points within the space. The space may be sample using randomized sampling or another sampling technique in order to predict output property values for each sample. In a case where a property mapping involves a color aspect, colorimetric binning may be used as the sampling method to predict colorimetry for each sample. The predicted output property values, e.g. values of a metric that may be measured, that are generated from the sampling stage (i.e. predicted values of a property, such as spectral reflectance) may then be quantized or 'binned' by subdividing the space of predicted output property values into various interval ranges. For example, in an example using color, the colorimetries predicted from the sampling stage may be binned by subdividing a colorimetric space (e.g. CIE XYZ etc.) into interval combinations in its three dimensions (e.g. based on color difference or the like). From this set of interval combinations, the MVoc vector values in each of the quantization levels, or bins, of the previous block may be considered as paramer sets, i.e. sets of particular printed material combinations that are similar in terms of a predicted measured property values, where similarity may be controlled by the size of the quantization levels or bins, e.g. by adjusting a size of a similarity/difference threshold. In a colorimetric example, paramer sets contain printing material combinations that look similar to each other in color. In this example, setting the separation of quantization levels, or bin sizes, to equal 1 in a uniform color space like CIE LAB results in a special case of paramer set: a metamer set, the contents of which are printing material combinations that are visually indistinguishable in color as opposed to being similar. In some examples, paramer sets may be formed from combinations of output property values. In certain cases, the property sets chosen to stay consistent or those chosen to demonstrate different measurements under different conditions may vary across space.

Following the configuration blocks described above, a predefined number of material-volume-coverage vectors that have different output property values, under the second set of inspection conditions, with respect to a reference material-volume-coverage vector in the paramer set are determined. In some cases, the predefined number of MVoc vectors that are distinguishable from one another under the second set of inspection conditions may be determined by the following operations. First, a reference MVoc vector value from the paramer set is selected. This reference MVoc vector value may be a value that would normally be selected for use in printing the printed output, e.g. an MVoc vector value that uses the least amount of material(s) or agent(s). In one case, selection of an MVoc paramer may comprise evaluating a grain metric, e.g. representative of a halftone grain that results from a particular MVoc vector value. For example, a paramer may be chosen that has a larger grain metric, i.e. representative of a 'grainier' appearance, to mask out certain differences (e.g. in color) between output paramers that for smoother, less grainy paramers may be objectionable. In one case, a grain metric may be considered in addition to a color or other property metric. For example, a paramer may be selected from a paramer set such that: 1) it has a property difference above a set threshold under a second set of inspection conditions, e.g. as compared with a previously selected paramer for another data value or a default case; and 2) has a predetermined level of grain to mask out the transition. For example, a level of grain may be selected that is the same as the level of grain selected for other paramers associated with other data values. The group of potential paramers following this stage may form a candidate set for use in data embedding.

Given a chosen second set of inspection conditions (and any associated inspection techniques), the properties of the MVoc vector values that form part of the candidate paramer set may be predicted under the second set of inspection conditions. For example, in the case of spectrophotometry, a spectral reflectance of the MVoc vector values may be predicted using available color models; alternatively, in a case of two-dimensional microphotography, pixel-by-pixel color difference statistics may be predicted. For a predefined number of MVoc vector values per paramer set, e.g. based on a number of different encoding levels, the MVoc vector values that are most different may be determined. This may be performed by, for example, determining an MVoc vector values within a paramer set that has the highest sum of metric differences as compared to any already selected MVoc vector values from within the candidate set (when the process starts, the first MVoc vector value in the candidate paramer set may be selected as a reference MVoc vector value). Thus, at the end of the described process, the result is at least a set of the most different MVoc vector values per property (e.g. color), given a chosen second set of inspection conditions.

In certain examples, data may be embedded in the printed output using the predefined number of material-volume-coverage vectors. For example, the set of most different MVoc vector values per spectral reflectance, for example, under a chosen second set of inspection conditions from the process exampled above may be used to embed data such as in the examples described in FIGS. 4 and 5. The data that is to be embedded in the printed output may comprise a repeating pattern, and/or may form part of a known coding scheme, e.g. a QR code.

Figure 7:
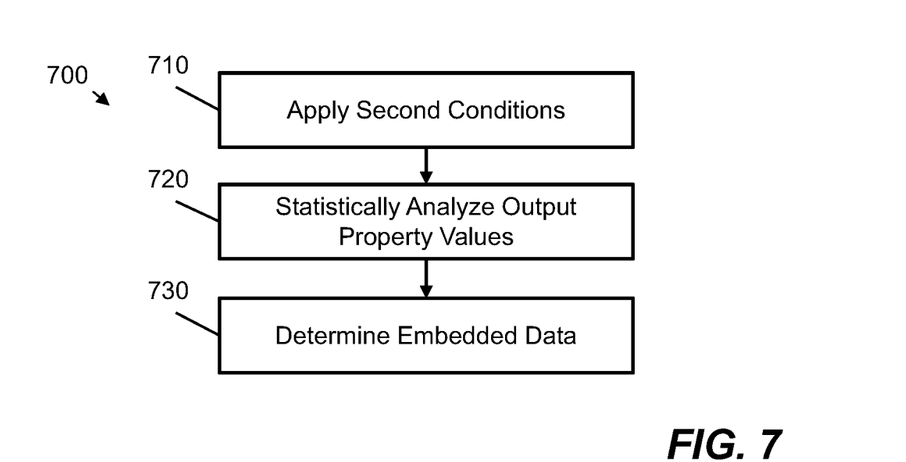
FIG. 7 is a flowchart showing a method of decoding data embedded in a printed output according to an example.

FIG. 7 shows a flowchart diagram of a method 700 for determining, or 'decoding' embedded data in a printed output. The method 700 may be used to decode data encoded by the method 600 of FIG. 6 and may be implemented by the decoder 230 of FIG. 2.

At block 710, a second set of inspection conditions is applied to portions of the printed output with embedded or encoded data. If it is not known which portion of a printed output comprises the embedded data the whole output may be inspected. In certain cases, a representation of the printed output may be acquired whilst the second set of conditions are applied. This may comprise capturing the printed output with a camera or CCD array, or applying inspection techniques such as using known measurement devices.

At block 720, output property values may be statistically analyzed. The statistical analysis may be performed on a digital version of the acquired representation of the printed output to determine property metrics for one or more portions of the printed output. In a case where the property comprises color, this may comprise determining a color difference or color value for an area. The determined property metrics may be mapped to one or more property data values. For example, this may comprise applying any quantization scheme described previously. In one case, a decoder may be supplied with mapping of property values under the second set of conditions to property data values. In another case, a property data value may be determined by the magnitude of a property value difference when compared to an unencoded, 0-value portion of the printed output, or a blank (e.g. "Z: 100%") material-volume-coverage vector value.

At block 730 the embedded data is determined. This may comprise determined data values being output to reconstruct the data that was encoded in the printed output. In certain cases, known error correction and/or detection techniques may be used to correct for any error introduced in the output and acquisition of the printed output with the encoded data.

In one case the data to be embedded in the printed output comprises a repeating pattern. In this case, blocks 720 and 730 comprise applying the second set of inspection conditions to portions of the printed output and statistically analyzing the output property values to determine the embedded data, e.g. based on correlations between repeated portions of the pattern.

FIG. 7 shows one particular example. In another case detection may be performed via visual inspection, e.g. a watermark or text may simply "appear" under the second set of inspection conditions.

In one variation of certain examples described herein, "data" to be encoded may not necessarily comprise data to be reconstructed. For example, the data to be encoded may comprise a printed output that is viewable under the second set of conditions and/or may comprise machine-readable printed portions that facilitate processing akin to image processing. In this case, the printed output may comprise a regular grid with every j th voxel having a different property value in a second color space (e.g. a different paramer). In this case, a grid of voxels may not be visible under the first 'normal' set of conditions but may be detectable under a second set of conditions, such as a smartphone flash. Thus, if a representation of the printed output is captured under the second set of conditions, the encoded data, in the form of a regular grid, may facilitate image registration and detection on a surface of the printed output using image processing algorithms such as statistical matching algorithms.

Figure 8:
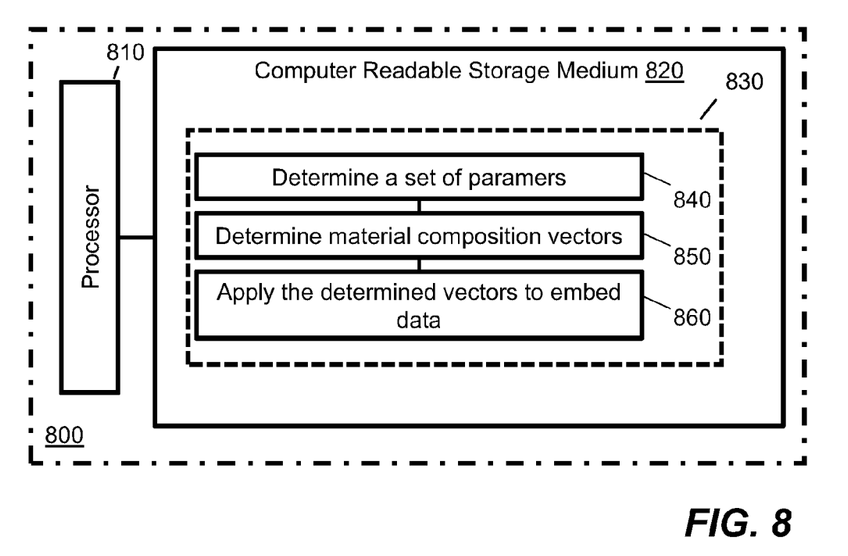
FIG. 8 is a schematic illustration of a processing device according to an example.

FIG. 8 shows an example of a non-transitory machine 800. Certain methods and systems as described herein may be implemented by a processor 810 that processes computer program code that is retrieved from a non-transitory storage medium 820. In some examples, the processor 810 and computer readable storage medium 820 are comprised within the non-transitory machine 800. Machine-readable medium 820 can be any medium that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 8, the machine-readable storage medium comprises instructions 830 which, when executed by at least one processor, may cause the processor to perform the encoding configuration operation described above.

As shown in FIG. 8, instructions 840 are arranged to cause a processor to determine, for at least one input property of a printed output associated with a first set of conditions, a set of paramers for the property. The paramer set may comprise material composition vectors associated with the printed output having output property values that differ by less than a predetermined threshold amount under the first set of conditions. The material composition vectors thus may indicate, for a spatial element of a printed output, a distribution of available material compositions. The instructions 850, when executed by at least one processor, then cause the processor to determine, for the set of paramers, a predefined number of material composition vectors. These vectors may be associated with the printed output and have different output property values with respect to a reference material composition vector in the paramer set, under a second set of conditions. The instructions 860, when executed by at least one processor, may finally cause the processor to apply the determined number of vectors to embed data in the printed output.

In one case, an input property of the printed output is color. In this case, the set of paramers comprises material composition vectors having color differences in an output color space below a predetermined threshold under the first set of conditions. The determined number of vectors then have maximum color differences and are used to embed data in the printed output, such that the embedded data is detectable when the second set of conditions are applied to the printed output.

Certain examples described herein provide a visually inconspicuous authentication mechanism that is applicable to both two and three dimensional printing. Certain examples may be flexibly applied to numerous different material properties and be tuned for different inspection mechanisms and conditions. In certain cases, a complexity of encoding can be controlled as a function of the complexity of the feature to be embedded, e.g. by controlling the number of predefined paramers that are available. In general, techniques are discussed that provide a way to embed identifiable features in a two or three-dimensional printed output, wherein the features may be imperceptible when the printed output is viewed under standard conditions, but wherein the features can be detected when the printed output are either inspected up-close, or under non-standard conditions. This framework allows for authentication without the need to dedicate specific visible features to the task that would interfere with the appearance of a printed surface.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:
an encoder to receive content data for a printed output and data to be encoded; and
an interface to access a plurality of output property mappings, each output property mapping comprising a mapping of at least one property value from the content data to an output value for a probabilistic distribution of a set of output material compositions for a spatial element of the printed output,
wherein, for k materials available for printing and L discrete printing states, the set of output material compositions comprises $L^k$ elements, each element having an associated probability value,
wherein the encoder is arranged to receive input property value data for the printed output and to output value data for a probabilistic distribution of a set of output material compositions for a spatial element of the printed output by accessing the plurality of output property mappings via the interface,
the encoder being arranged to select an output property mapping from the plurality of output property mappings for a portion of the printed output according to a data value from the data to be encoded.

2. The system of claim 1, comprising:
a decoder to obtain a representation of the printed output by the encoder under a predetermined set of conditions and to output the data values of the data,
wherein the decoder is arranged to determine a property metric for one or more spatial elements of the representation and to map the property metric to one of the data values.

3. The system of claim 1, comprising:
a multi-dimensional printing device to receive value data output by the encoder relating to a plurality of spatial elements and to generate a multi-dimensional printed output based on the value data.

4. The system of claim 3, wherein the probabilistic distribution of a set of output material compositions for a spatial element of the printed output comprises at least one of:
an printing-fluid-primary-overprint area-coverage vector that instructs a deposition of printing fluid in a unit area of a print medium; and
a material-volume-coverage vector that instructs deposition of material in a unit volume of three-dimensional printed output.

5. A method of embedding data in a printed output having at least two-dimensions comprising:
obtaining content data for the printed output;
obtaining data to be embedded in the printed output;
determining an input property value for a content element from the content data; and
determining an output value for a probabilistic distribution of a set of output material compositions for a spatial element of the printed output corresponding to the content element based on the data to be embedded and the input property value,
wherein, for k materials available for printing and L discrete printing states, the set of output material compositions comprises $L^k$ elements, each element having an associated probability value, and
wherein, responsive to the spatial element being used to embed data, the output value has an associated first set of properties under a first set of inspection conditions and an associated second set of properties under a second set of inspection conditions, the first set of properties and the second set of properties differing by at least a predefined property distance metric value.

6. The method of claim 5, wherein:
responsive to the spatial element not being used to embed data, the output value has an associated third set of properties under the first set of conditions and an associated fourth set of properties under the second set of conditions,
the third set of properties and the fourth set of properties differing by less than the predefined property distance metric value, and
the third set of properties and the first set of properties also differing by less than the predefined property distance metric value.

7. The method of claim 5, comprising:
halftoning the output value to generate printing instructions for one of a two-dimensional and three-dimensional print output,
wherein the printing instructions instruct a discrete printing state for at least one of the materials available for printing; and
generating the print output based on the printing instructions.

8. The method of claim 5, wherein:
the printed output is three-dimensional;
the spatial element is a volume element; and
the probabilistic distribution of the set of output material compositions is a material-volume-coverage vector representing a probabilistic volumetric distribution.

9. The method of claim 8, wherein:
the spatial element is a volume element located within an interior of the printed output; and
the second set of inspection conditions comprises accessing the interior of the printed output and applying the second set of inspection conditions to said interior.

10. The method of claim 8, comprising:
determining, for at least one property of a three-dimensional printed output associated with a first set of inspection conditions, a set of parameters for the property, a parameter set comprising material-volume-coverage vectors having output property values that differ by less than a predetermined threshold amount under the first set of inspection conditions;
determining, for the set of parameters, a predefined number of material-volume-coverage vectors that have different output property values, under the second set of inspection conditions, with respect to a reference material-volume-coverage vector in the parameter set;
using the predefined number of material-volume-coverage vectors to embed data in the printed output.

11. The method of claim 10, wherein determining a predefined number of material-volume-coverage vectors comprises determining a predefined number of material-volume-coverage vectors that result in a grain metric that is above a predefined threshold.

12. The method of claim 5, wherein the second set of inspection conditions comprises at least one of:
- viewing under magnification;
- micro-photographic measurement;
- spectrophotometric measurement;
- lighting by an increased amount of ultraviolet light, infrared light or any specific, non-standard light;
- exposing at least part of the printed output to a chemical composition;
- applying mechanical stress;
- applying mechanical strain;
- heating the printed output;
- measuring electrical conductivity or electrical resistance;
- measuring a magnetic signature of the printed output.

13. The method of claim 5, wherein the data to be embedded in the printed output comprises a repeating pattern and the method comprises applying the second set of inspection conditions to portions of the printed output and statistically analyzing the output property values to determine the embedded data.

14. A non-transitory machine readable medium comprising instructions which, when executed by at least one processor, cause the processor to:
- determine, for at least one input property of a printed output associated with a first set of conditions, a set of parameters for the property, the parameter set comprising material composition vectors associated with the printed output having output property values that differ by less than a predetermined threshold amount under the first set of conditions, the material composition vectors indicating, for a spatial element of a printed output, a distribution of available material compositions;
- determine, for the set of parameters, a predefined number of material composition vectors associated with the printed output that have different output property values with respect to a reference material composition vector in the parameter set, under a second set of conditions;
- apply the determined number of vectors to embed data in the printed output.

15. The non-transitory machine readable medium of claim 14, wherein:
- an input property of the printed output is color;
- the set of parameters comprises material composition vectors having color differences in an output color space below a predetermined threshold under the first set of conditions; and
- a determined number of vectors having maximum color differences are used to embed data in the printed output, such that the embedded data is detectable when the second set of conditions are applied to the printed output.

* * * * *